United States Patent
Dande et al.

(10) Patent No.: US 12,271,831 B2
(45) Date of Patent: Apr. 8, 2025

(54) ROUTING A DATA PROCESSING TRANSACTION BASED ON MACHINE LEARNING

(71) Applicant: Bank of America Corporation, Charlotte, NC (US)

(72) Inventors: Pratap Dande, Saint Johns, FL (US); Vijaya L Vemireddy, Plano, TX (US); Brandon Sloane, Indian Land, SC (US); Jinna Z Kim, Charlotte, NC (US); Kapil Chhibber, Davis, CA (US); Robert Nyeland Huggins, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 979 days.

(21) Appl. No.: 17/339,686

(22) Filed: Jun. 4, 2021

(65) Prior Publication Data

US 2022/0391720 A1    Dec. 8, 2022

(51) Int. Cl.
*G06Q 20/10* (2012.01)
*G06N 5/04* (2023.01)
*G06N 20/00* (2019.01)
*G06Q 20/02* (2012.01)

(52) U.S. Cl.
CPC ............. *G06N 5/04* (2013.01); *G06N 20/00* (2019.01); *G06Q 20/023* (2013.01); *G06Q 20/102* (2013.01)

(58) Field of Classification Search
None
See application file for complete search history.

(56) References Cited

U.S. PATENT DOCUMENTS

| | | | |
|---|---|---|---|
| 11,823,201 B2* | 11/2023 | Wintle | G06Q 20/4016 |
| 2005/0027654 A1 | 2/2005 | Adrian | |
| 2005/0044197 A1 | 2/2005 | Lai | |
| 2005/0086176 A1 | 4/2005 | Dahlgren et al. | |
| 2005/0144126 A1 | 6/2005 | Commodore et al. | |
| 2007/0043663 A1 | 2/2007 | Simpson | |
| 2007/0050292 A1 | 3/2007 | Yarbrough | |
| 2007/0118472 A1 | 5/2007 | Allen-rouman et al. | |
| 2007/0124165 A1 | 5/2007 | Eckel, Jr. | |
| 2007/0260537 A1 | 11/2007 | Stone | |
| 2007/0282743 A1 | 12/2007 | Lovelett et al. | |
| 2009/0076950 A1 | 3/2009 | Chang et al. | |
| 2009/0112747 A1 | 4/2009 | Mullen et al. | |

(Continued)

*Primary Examiner* — William J Jacob

(57) ABSTRACT

According to certain embodiments, a routing system comprises a memory operable to store historical data associated with a plurality of previous data processing transactions and a processor operably coupled to a network interface and the memory. The processor is configured to obtain the historical data associated with the plurality of previous data processing transactions transacted using a first routing between a first computing system and a second computing system and determine a pattern based on the historical data, the pattern determined based on machine learning. The processor is further configured to associate the pattern with a second routing between the first computing system and the second computing system, determine an upcoming data processing transaction corresponding to the pattern, and use the second routing to transact the upcoming data processing transaction.

20 Claims, 2 Drawing Sheets

(56) References Cited

U.S. PATENT DOCUMENTS

| | | |
|---|---|---|
| 2009/0210347 A1 | 8/2009 | Sarcanin |
| 2010/0030675 A1 | 2/2010 | Hanan et al. |
| 2010/0030687 A1 | 2/2010 | Panthaki et al. |
| 2010/0161405 A1 | 6/2010 | Cervenka et al. |
| 2010/0205091 A1 | 8/2010 | Graziano et al. |
| 2010/0280909 A1 | 11/2010 | Zhang et al. |
| 2010/0288834 A1 | 11/2010 | Tichelaer et al. |
| 2011/0055079 A1 | 3/2011 | Meaney et al. |
| 2011/0119188 A1 | 5/2011 | Clayton et al. |
| 2012/0150568 A1 | 6/2012 | Greener et al. |
| 2012/0179610 A1 | 7/2012 | Allen-rouman et al. |
| 2012/0191594 A1 | 7/2012 | Welch et al. |
| 2012/0253990 A1 | 10/2012 | Skala |
| 2012/0323777 A1 | 12/2012 | Liberty |
| 2013/0226807 A1 | 8/2013 | Mascavage, III et al. |
| 2013/0232032 A1 | 9/2013 | Chaturvedi et al. |
| 2013/0238492 A1 | 9/2013 | Muthu et al. |
| 2014/0052621 A1 | 2/2014 | Love |
| 2014/0229365 A1 | 8/2014 | Gupta |
| 2014/0297370 A1 | 10/2014 | Allen et al. |
| 2015/0019314 A1 | 1/2015 | Salmon et al. |
| 2015/0081491 A1 | 3/2015 | Brereton et al. |
| 2015/0081553 A1 | 3/2015 | Smith |
| 2015/0154570 A1* | 6/2015 | Dheer ................ G06Q 40/02 705/44 |
| 2015/0235309 A1 | 8/2015 | Malhotra et al. |
| 2015/0294317 A1 | 10/2015 | Kernene |
| 2015/0372880 A1 | 12/2015 | Allen et al. |
| 2016/0026991 A1 | 1/2016 | Murdoch et al. |
| 2016/0071069 A1 | 3/2016 | Skala |
| 2016/0267449 A1 | 9/2016 | Forzley |
| 2017/0124563 A1 | 5/2017 | Hrybok |
| 2017/0140366 A1 | 5/2017 | Xing et al. |
| 2017/0262833 A1 | 9/2017 | Xing |
| 2018/0025334 A1 | 1/2018 | Pourfallah et al. |
| 2018/0046947 A1 | 2/2018 | Clayton et al. |
| 2018/0211212 A1 | 7/2018 | Chin |
| 2019/0333062 A1 | 10/2019 | Gallagher, III |
| 2019/0378100 A1 | 12/2019 | Muthu et al. |
| 2020/0175496 A1 | 6/2020 | Finke et al. |
| 2020/0265415 A1 | 8/2020 | Chattopadhyay et al. |
| 2021/0012321 A1 | 1/2021 | Mcgovern |
| 2021/0042712 A1 | 2/2021 | Crowley et al. |
| 2021/0073750 A1 | 3/2021 | Ledford et al. |
| 2022/0300917 A1* | 9/2022 | Wied ................ G06Q 20/027 |
| 2022/0327504 A1* | 10/2022 | Koren ................ G06F 21/316 |

* cited by examiner

ROUTING A DATA PROCESSING TRANSACTION BASED ON MACHINE LEARNING

TECHNICAL FIELD

Certain embodiments of the present disclosure relate to routing a data processing transaction based on machine learning.

BACKGROUND

A computer may use machine learning to automatically improve how the computer performs a task. Machine learning may involve analyzing data in order to make predictions or decisions associated with performing the task, without requiring a user to explicitly program the computer to perform the task. Machine learning may be used in a wide variety of applications, such as applications where it is difficult for a user to develop computer code to perform the needed tasks.

SUMMARY

The system disclosed in the present application provides a technical solution to technical problems. As an example, existing techniques for transacting a data processing transaction between a first computing system and a second computing system may use a first routing that involves a third computing system between the first computing system and the second computing. Involving the third computing system may be inefficient. For example, involving the third computing system may introduce delay and increase signaling overhead in a network. The system disclosed in the present application provides a technical solution to this technical problem by providing techniques for routing a data processing transaction between a first computing system and a second computing according to a second routing. The second routing may be more efficient than the first routing. For example, the second routing may use a machine-to-machine communication channel between the first computing system and the second computing system, without involving the third computing system in transacting the data processing transaction.

The system disclosed in the present application leverages machine learning to identify upcoming data processing transactions that can be transacted using the second routing. These transactions are identified based on recurring patterns determined from historical data processing transactions transacted using the first routing. The disclosed system provides several practical applications and technical advantages, which include a process for using machine learning to determine a pattern based on historical data associated with a plurality of previous data processing transactions transacted using a first routing between a first computing system and a second computing system. More specifically, this process allows a system to associate the pattern with a second routing between the first computing system and the second computing system, determine an upcoming data processing transaction corresponding to the pattern, and use the second routing to transact the upcoming data processing transaction. Existing techniques are typically limited to only transacting upcoming data processing transactions using the same routing as historical data processing transactions. In contrast, the disclosed process is able to identify upcoming data processing transactions that can be transacted using a more efficient routing. This process provides a practical application by improving the speed of transacting the data processing transaction. These practical applications not only improve the system's ability to transact the data processing transaction, but also improve the underlying network and the devices within the network. For example, signaling overhead in the network may be reduced by transacting the data processing transaction according to a more efficient routing that does not involve a third computing system in the middle of a data processing transaction between a first computing system and a second computing system.

According to certain embodiments, a routing system comprises a memory operable to store historical data associated with a plurality of previous data processing transactions and a processor operably coupled to a network interface and the memory. The processor is configured to obtain the historical data associated with the plurality of previous data processing transactions transacted using a first routing between a first computing system and a second computing system and determine a pattern based on the historical data, the pattern determined based on machine learning. The processor is further configured to associate the pattern with a second routing between the first computing system and the second computing system, determine an upcoming data processing transaction corresponding to the pattern, and use the second routing to transact the upcoming data processing transaction.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION

For a more complete understanding of the present disclosure and for further features and advantages thereof, reference is now made to the following description taken in conjunction with the accompanying example drawings, in which.

DETAILED DESCRIPTION

Figure 1:
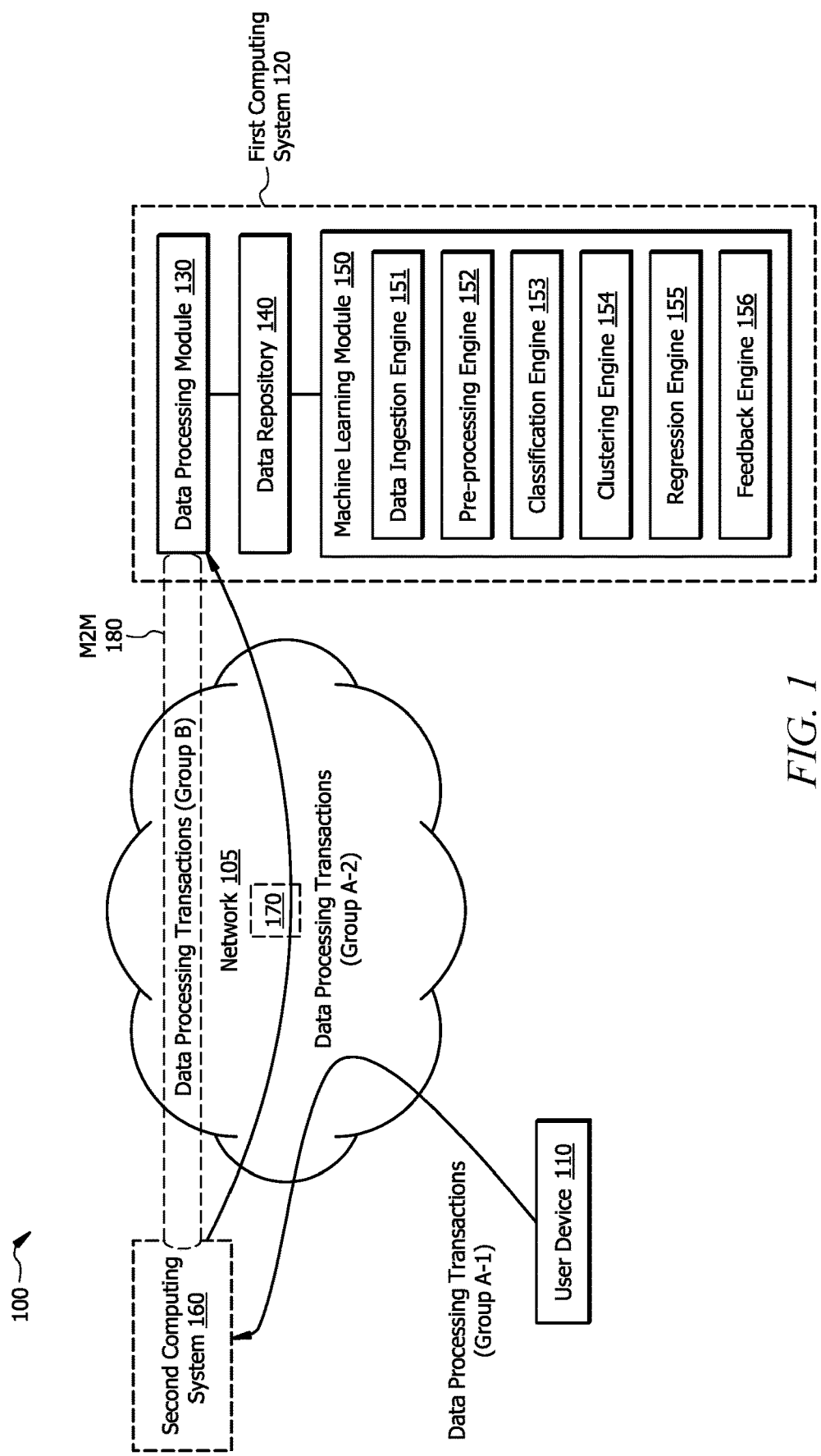
FIG. 1 illustrates an example of a system, in accordance with certain embodiments.
Figure 2:
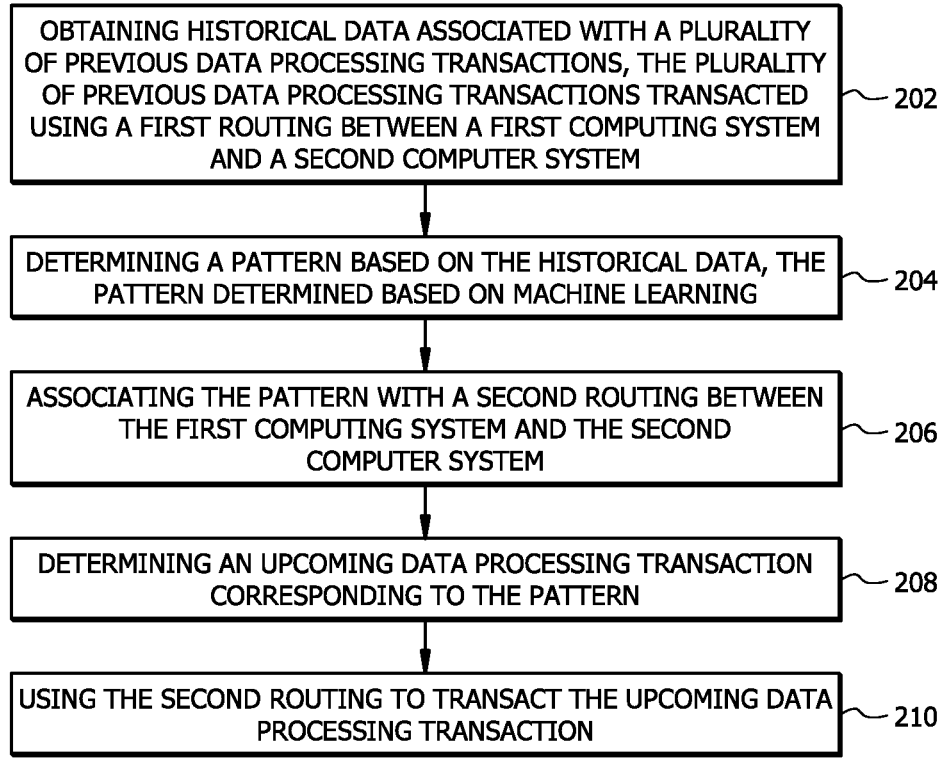
FIG. 2 illustrates an example of a method, in accordance with certain embodiments.
Figure 3:
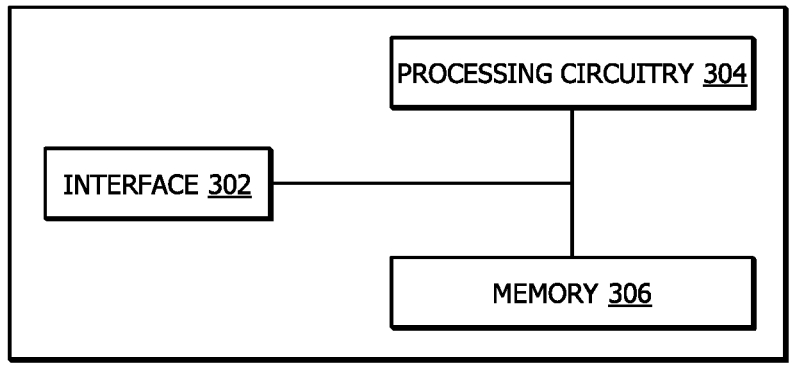
FIG. 3 illustrates an example of computing components, in accordance with certain embodiments.

Certain embodiments of the present disclosure may be implemented in accordance with one or more of FIGS. 1-3, like numerals used to describe like components of the various figures.

FIG. 1 illustrates an example of system 100, in accordance with certain embodiments. According to certain embodiments, system 100 comprises a network 105 that facilitates communication among one or more user devices 110, one or more first computing systems 120, one or more second computing systems 160, and/or one or more third computing systems 170. In general, first computing system 120 obtains historical data associated with a plurality of previous data processing transactions transacted using a first routing between first computing system 120 and second computing system 160, determines a pattern based on the historical data, associates the pattern with a second routing between first computing system 120 and second computing system 160, determines an upcoming data processing transaction corresponding to the pattern, and uses the second routing to transact the upcoming data processing transaction.

In the example of FIG. 1, the plurality of previous data processing transactions comprise the data processing transactions labeled "Group A" (i.e., "Group A-1" and "Group A-2"). As an example, user device 110 may initiate the previous data processing transactions by sending a request to second computing system 160 (labeled "Group A-1"). Second computing system 160 may then interact with first computing system 120, for example, via third computing system 170 in order to transact the previous data processing transactions (labeled "Group A-2"). Thus, the first routing illustrated in the example of FIG. 1 includes user device 110, first computing system 120, second computing system 160, and third computing system 170.

In the example of FIG. 1, one or more upcoming data processing transactions are included in the data processing transactions labeled "Group B." As shown in FIG. 1, the second routing used to transact the one or more upcoming data processing transactions comprises a machine-to-machine (M2M) communication channel 180 between first computing system 120 and second computing system 160. The M2M communication channel 180 facilitates transacting the one or more upcoming data processing transactions independently of the third computing system 170. Thus, the second routing may be more efficient than the first routing. Additionally, certain embodiments configure first computing system 120 to automatically transact recurring data processing transactions such that user device 110 need not send a request for each such data processing transaction.

Network 105 represents any suitable network(s) operable to facilitate communication between user device 110, first computing system 120, second computing system 160, and/or third computing system 170. Network 105 may include any interconnecting system capable of transmitting audio, video, signals, data, messages, or any combination of the preceding. Network 105 may include all or a portion of a public switched telephone network (PSTN), a cellular network, a base station, a gateway, a public or private data network, a local area network (LAN), a metropolitan area network (MAN), a wide area network (WAN), a wireless WAN (WWAN), a local, regional, or global communication or computer network, such as the Internet, a wireline or wireless network, an enterprise intranet, or any other suitable communication link, including combinations thereof, operable to facilitate communication between the components.

User device 110 generally refers to a computing device that can be used by the user to interact with first computing system 120 and/or second computing system 160 via network 105. Examples include a workstation, a personal computer, a laptop, a tablet computer, a phone, a smartphone, a handheld device, a wireless device, etc.

Each of the computing systems (e.g., first computing system 120, second computing system 160, and third computing system 170) may comprise hardware and/or software capable of communicating with each other and/or user device 110 via network 105. Examples of a computing system may include one or more servers (e.g., cloud-based servers, file servers, web servers, etc.), data centers, virtual machines, mainframe computers, etc. In certain embodiments, the different computing systems are each associated with a respective enterprise (such as a business or company).

In certain embodiments, first computing system 120 comprises a data processing module 130, a data repository 140, and a machine learning module 150. In general, data processing module 130 transacts data processing transactions, data repository 140 stores data (including, e.g., historical data), and machine learning module 150 determines a pattern based at least in part on the historical data. In certain embodiments, machine learning module 150 comprises data ingestion engine 151, pre-processing engine 152, classification engine 153, clustering engine 154, regression engine 155, and/or feedback engine 156.

Data ingestion engine 151 receives data used to train the machine learning module 150, such as historical data obtained from data repository 140. Pre-processing engine 152 translates the data into normalized datasets that map to understood entities and/or categories. For example, in certain embodiments, functionality of pre-processing engine 152 includes tagging the historical data with metadata. Classification engine 153 may apply a classification algorithm that uses the normalized data to assign each of the previous data processing transactions to a respective class. The class may be the same or different for different previous data processing transactions, for example, depending on entities and/or categories that the previous data processing transactions do or do not have in common. In certain embodiments, clustering engine 154 applies grouping assignments based upon defined frameworks. Regression engine 155 may apply regression algorithms to generate predicted values based on the clustered and normalized data. Feedback engine 156 continues to assess the predictive values against actual historical results and over time refines the machine learning.

M2M communication channel 180 comprises any suitable communication channel that facilitates transacting a data processing transaction between the first computing system 120 and the second computing system 160. In certain embodiments, M2M communication channel 180 may comprise a direct communication channel or a point-to-point communication channel. In certain embodiments, M2M communication channel 180 may comprise a dedicated communication channel. In certain embodiments, M2M communication channel may comprise a virtual private network (VPN), a software-defined WAN (SD-WAN), or a Secure Access Service Edge (SASE). In other embodiments, M2M communication channel 180 may simply comprise any suitable portion of network 105 that facilitates communication between first computing system 120 and second computing system 160.

For purposes of example and explanation, FIG. 1 depicts the network as including certain components. However, this disclosure recognizes that the network may include any suitable components. One of ordinary skill in the art will appreciate that certain components can be omitted and other components not mentioned herein can be added. Additionally, components can be integrated or separated in any suitable manner. Functionality described in FIG. 1 can be distributed or localized in any suitable manner. For simplicity, FIG. 1 depicts one of each component. Other embodiments may include multiples of one or more components. As an example, system 100 may include multiple user devices 110. Certain user devices 110 may be associated with the same user, such as the user's personal computer and the user's smartphone. Certain user devices 110 may be associated with different users. For example, first computing system 120 may monitor data processing transactions associated with other users, determine patterns, make recommendations to the other users based on the patterns, etc. As another example, system 100 may include multiple second computing systems 160 (e.g., different second computing systems 160 may be associated with different enterprises with which first computing system 120 performs data processing transactions).

In certain embodiments, system 100 may be used to facilitate online payments from a customer to a vendor. The vendor could be a business, such as a service provider (e.g., phone company, Internet service provider, utility company, subscription service provider, etc.), a vendor of goods, etc. In the example, the first computing system 120 may be associated with a financial institution, such as a bank where the customer maintains a financial account. The second computing system 160 may be associated with the vendor. The third computing system 170 may be associated with an automated clearing house (ACH). ACH may refer to a computer-based electronic network for processing transactions, usually domestic low value payments, between participating financial institutions. ACH may support both credit transfers and direct debits. The ACH system is designed to process batches of payments containing numerous transactions.

The ACH system may introduce certain trade-offs. For example, adding an ACH into the online payment process can introduce delay, potentially on the order of several days, to allow ACH to perform its processing. Thus, certain embodiments provide a solution that involves determining a pattern of recurring online payments and sending the customer a recommendation to process such online payments via another route. In particular, certain embodiments send the customer a recommendation via user device 110. The customer interacts with user device 110 to accept the recommendation. After the customer accepts the recommendation, future recurring online payments to the vendor may be transacted via a machine-to-machine (M2M) communication channel between the first computing system 120 (the computing system associated with the financial institution where the customer maintains a financial account) and the second computing system 160 (the computing system of the vendor). The M2M communication channel 180 may facilitate transacting the online payment independently of the third computing system 170 (e.g., the ACH). By eliminating the middle-man, the M2M communication channel 180 may facilitate a transaction akin to a wire transfer, which may be processed without incurring the days-long delay associated with ACH.

In certain embodiments, the first computing system 120 may offer a convenient portal for the customer to make recurring online payments to multiple vendors using funds from the financial account that the customer maintains with the financial institution associated with the first computing system 120. For example, instead of having to configure recurring online payments via a first web page associated with a first vendor (e.g., phone company), a second web page associated with a second vendor (e.g., utility company), and so on, the customer can configure recurring online payments with the first vendor, the second vendor, and/or other vendors via a web page associated with the customer's financial institution. Thus, the web page associated with the customer's financial institution may provide a centralized resource for managing online payments.

Certain embodiments may provide a user-friendly process for setting up first computing system 120 to manage the recurring online payments. In certain embodiments, first computing system 120 monitors online payments that the customer conducts via the first computing system 120 to determine a pattern of recurring online payments. As an example, first computing system 120 may determine that the user pays the phone company $50 around the 15$^{th}$ day of every month. First computing system 120 may then send the customer a recommendation, via user device 110, to set up a recurring online payment to the phone company. The customer may accept the recommendation in order to set up the recurring online payment via first computing system 120. For example, the customer may interact with user device 110 to select one or more vendors to establish recurring online payments with. The customer may opt to accept recurring online payments with some vendors and may opt to decline recurring online payments with other vendors. As an example, a customer may opt to accept recurring online payments with a vendor that charges the same amount every month (such as a phone subscription), but may opt to decline recurring online payments with a vendor that charges fluctuating rates (such as a utility for which the customer prefers to initiate payment manually).

Optionally, first computing system 120 may use the pattern to automatically pre-populate one or more recurring online payment details, such as vendor information, financial account from which the payment is to be made, payment amount, payment schedule, etc. In addition, or in the alternative, first computing system 120 may receive one or more recurring online payment details from the user. In certain embodiments, first computing system 120 may use cognitive analysis to detect and correct data entry errors made by the user. As an example, if the user configures a payment amount that is significantly different than the payment amounts identified from a pattern of similar online payments, first computing system 120 may detect and correct the payment amount. Continuing with the previous example, if the customer usually pays the phone company $50 per month, first computing system 120 may detect a data entry error if the customer configures a recurring online payment to the phone company of $500 a month.

In certain embodiments, first computing system 120 may be further configured to automatically cancel an auto-pay option that the customer has previously set up with the vendor via the second computing system 160. For example, suppose the customer had previously logged on to the phone company's website and set up auto-pay. In connection with setting up first computing system 120 to manage recurring online payments with the phone company, first computing system 120 may instruct second computing system 160 to cancel the auto-pay in order to avoid duplicate payments. This may simplify the process of moving management of the online payments from the second computing system 160 to the first computing system 120.

Certain embodiments may generate customer alerts based on monitoring a pattern associated with online payments. The alerts may indicate that first computing system 120 has detected unusual activity associated with the customer's financial account, that first computing system 120 has prepared a financial management recommendation for the customer, or other information. Examples of unusual activity may include a current bill being higher than usual (e.g., if the bill is more than X % higher than usual), overall spending being higher than usual, multiple payments being made to a vendor that the user does not usually do business with (e.g., purchases that a particular customer ordinarily makes for special occasions, like jewelry purchases, may be flagged as unusual for that customer if they start to occur on a monthly basis), or other activity that is out-of-the ordinary for that customer. Examples of financial management recommendations may include recommending an optimal scheduling for making payments (e.g., based on spending patterns, due dates of bills from various customers, dates when the customer receives a paycheck, etc.) or alerting a customer if the customer is over-paying compared to similar customers (e.g., if the customer's phone bill is more than X % higher than similar customers, a recommendation can be made to switch phone companies or re-negotiate the customer's phone plan).

In certain embodiments, machine learning may include ingesting historical data associated with previous online payments. As an example, an ingestion engine 151 may use data crawlers to ingest historical data from online payments across multiple financial accounts (e.g., credit accounts, debit accounts, etc.), multiple vendors, etc. Pre-processing engine 152 may normalize the historical data. Normalizing the historical data may include formatting or structuring the historical data to be consistent with an expected format used across data sets and/or tagging the historical data with metadata. Classification engine 153 may classify previous online payments. As an example, classification engine 153 may classify a previous online payment as a utility bill payment based on vendor information. Classification engine 153 may analyze other attributes associated with the online payment to increase the probability of making an accurate classification (e.g., to ensure that the other attributes are sufficiently consistent with the classification). Examples of other attributes may include payment amount, date, financial account used for payment, payment channel, etc. Clustering engine 154 may group transactions for rules-based predictive analytics, and regression engine 155 may apply the analytics. For example, regression engine 155 may predict that the user will be paying a particular amount to a particular vendor over a particular channel at a particular time (e.g., next month). The prediction may be based on statistical analytics and pattern recognition. Feedback engine 156 may confirm that the prediction is correct or modify the predictive analytics if needed. For example, as further online payments are made and added to the historical data, feedback engine can determine whether the added historical data indicates to update the prediction.

FIG. 2 illustrates an example of a method 200 that may be performed by a computing system, such as the first computing system 120 described with respect to FIG. 1. The method 200 begins at step 202 with obtaining historical data associated with a plurality of previous data processing transactions. The plurality of previous data processing transactions are transacted using a first routing between a first computing system 120 and a second computing system 160. In certain embodiments, the first routing includes a third computing system 170 that facilitates transacting the data processing transaction between the first computing system 120 and the second computing system 160. As an example, the data processing transactions may comprise one or more online payments, and the first routing may route the online payments from a first computing system 120 (e.g., a computing system associated with a financial institution that maintains a financial account on behalf of a customer) to a second computing system 160 (e.g., a computing system associated with a vendor that sells goods or services to the customer) via a third computing system 170 (e.g., a computing system associated with an ACH that facilitates the payment). In certain embodiments, the first routing may further include messaging from the customer's user device 110 to the second computing system 160. For example, if the customer does not have auto-pay set up with the second computing system 160, the customer may manually authorize second computing system 160 to obtain payment from the first computing system 120 by sending messaging via user device 110.

The method 200 proceeds to step 204 with determining a pattern based on the historical data. In certain embodiments, the pattern may detect recurring online payments to a particular vendor. The pattern may indicate further information about the payments, such as payment amount (e.g., a recurring amount, or a range within which the payment amount typically falls), schedule information (e.g., if the payment typically recurs daily, weekly, monthly, annually, or according to another schedule, and/or if the payment typically recurs on a particular day or date, such as on Mondays, the $1^{st}$ day of each month, etc.), or other suitable information.

Certain embodiments determine the pattern based on machine learning. As an example, the machine learning may process the historical data to yield normalized data. Normalization may convert the historical data to a format or structure that conforms to a pre-defined format or structure that the machine learning is configured to analyze. In this manner, historical data can be presented consistently from one data set to the next, regardless of the form in which it was received (e.g., historical data from different sources, such as a credit line of business and a debit line of business, may use different formats). In certain embodiments, the pre-defined format or structure may associate the historical data with metadata that allows the machine learning to parse or interpret the data accurately. The normalized data can be used to assign the plurality of previous data processing transactions to one or more classes. As one example, certain embodiments may assign the previous data processing transactions based on vendor. Thus, one or more previous online payments to a utility company may be assigned to a first class, one or more previous online payments to an Internet service provider may be assigned to a second class, and so on. The machine learning may then determine, based on the one or more classes, a subset of the plurality of previous data processing transactions. The subset comprises recurring data processing transactions. For example, machine learning may determine that online payments to a first vendor associated with one class are made on a one-off or sporadic basis, or vary widely in amount. Machine learning may determine that online payments to a second vendor associated with another class are made on a recurring basis, such as monthly. Thus, machine learning may conclude that no pattern exists for the first vendor, but that a pattern has been detected for the second vendor. The machine learning may determine the pattern based on the recurring data processing transactions.

The method 200 proceeds to step 206 with associating the pattern with a second routing between the first computing system 120 and the second computing system 160. In certain embodiments, the second routing does not include the third computing system 170. For example, instead of including the third computing system 170 (such as a computing system associated with an ACH), the second routing may use a machine-to-machine (M2M) communication channel 180 between the first computing system 120 and the second computing system 170. The M2M communication channel 180 facilitates transacting the data processing transaction directly between the first computing system 120 and the second computing system 160 (independently of the third computing system 170). Thus, the second routing may improve efficiency compared to the first routing. For example, the second routing may avoid delays associated with including the third computing system 170. In the context of online payments, delays associated with ACH processing, which may be on the order of several days, can be avoided. Additionally, compared to the first routing, the simplified second routing may free up network capacity, processing capacity, memory capacity, or other computing resources of network 105, first computing system 120, second computing system 160, and/or third computing system 170.

In certain embodiments, associating the pattern with the second routing may be in response to obtaining the user's permission to use the second routing. As an example, certain embodiments send a recommendation to a user (the customer/user on behalf of whom an upcoming data processing transaction corresponding to the pattern is to be transacted). The recommendation indicates to the user that the computing system recommends using the second routing to transact the upcoming data processing transaction. In certain embodiments, the recommendation may implicitly recommend using the second routing. For example, certain embodiments send the user's user device 110 a recommendation that causes user device 110 to display menu options to the user. In the online payment example, the menu options may allow the user to accept or decline a recommendation to set up a recurring payment from the user's bank account to the vendor. Thus, the recommendation implicitly recommends the second routing without necessarily having to provide the details of the second routing to the user. The method 200 may associate the pattern with the second routing based on receiving a response from the user (e.g., via user device 110) indicating that the user accepts the recommendation.

In certain embodiments, the method 200 further comprises sending the second computing system 160 an instruction to cancel a configuration that automates using the first routing to transact the upcoming data processing transaction. Certain embodiments send the instruction in response to associating the pattern with the second routing. In this manner, the method 200 may facilitate using the second routing instead of the first routing for the upcoming data processing transaction. For example, for the case where the upcoming data processing transaction is an online payment, the instruction may instruct the second computing system 160 (the computing system associated with the vendor) to cancel an auto-pay option that the user previously configured via the vendor's web site in order to avoid duplicate online payments.

The method 200 proceeds to step 208 with determining the upcoming data processing transaction corresponding to the pattern. Certain embodiments determine the upcoming data processing transaction based at least in part on the pattern. For example, if the pattern indicates that the user pays the phone company $50 on the $15^{th}$ of every month, the method 200 may determine that there is an upcoming data processing transaction to pay the phone company $50 on the $15^{th}$ of the current month. Certain embodiments determine the upcoming transaction based at least in part on information received from the user. For example, the user can interact with user device 110 to schedule a payment and/or a payment amount for a particular vendor.

Certain embodiments may use the pattern to detect and correct an error in a user's request for an upcoming data processing transaction. For example, the method 200 may receive data associated with the upcoming data processing transaction from a user, detect an error in the data associated with the upcoming data processing transaction based on comparing the data associated with the upcoming data processing transaction to the pattern, and use the pattern to correct the data associated with the upcoming data processing transaction. As an example, the method 200 may detect that the user requesting an online payment made a data entry error if the pattern indicates that the user usually pays a particular vendor the same amount every month, but this month the user has requested to pay a significantly higher amount. Prior to correcting the data, certain embodiments may alert the user. For example, suppose the user usually pays the phone company $50 per month for phone service. Suppose the user also purchased a phone from the phone company this month, so this month's bill includes both the cost of the new phone and the regular $50 per month for phone service. The method 200 may detect the unusual activity and alert the user, and the user may indicate to proceed with the payment (including the cost of the new phone) because the user expected the added cost.

At step 210, the method 200 uses the second routing to transact the upcoming data processing transaction.

Method 200 may repeat one or more steps as needed. As an example, in connection with transacting the upcoming data processing transaction, certain embodiments may obtain data associated with said transaction and add the data to the historical data. In other words, once the upcoming data processing transaction has been transacted, said transaction may be considered one of the previous data processing transactions. The updated historical data may be used to determine an updated pattern. The updated pattern may be used to determine one or more upcoming data processing transactions (e.g., new upcoming data processing transactions) that correspond to the pattern.

As an example, suppose the historical data in step 202 comprises data associated with previous data processing transactions occurring in January, February, and March. The method may determine a pattern based on the historical data associated with the previous data processing transactions occurring in January, February, and March. The method may then determine that an upcoming data processing transaction in April corresponds to the pattern, and may use the second routing to transact the upcoming data processing transaction. In connection with transacting the April data processing transaction, the method may change the status of the April data processing transaction from "upcoming" to "previous," and may add data associated with the April data processing transaction to the historical data. Machine learning may analyze the data associated with the April data processing transaction to determine whether or not the pattern needs to be updated. If needed, machine learning may update the pattern. The method may then determine that a new upcoming data processing transaction (e.g., a transaction in May) corresponds to the pattern, and may use the second routing to transact the new upcoming data processing transaction.

FIG. 3 illustrates an example of computing components 300, in accordance with certain embodiments. The computing components 300 may be used to implement any of the structures illustrated in FIG. 1, or one or more portions thereof, such as network 105, user device 110, first computing system 120, second computing system 160, and/or third computing system 170. The computing components 300 may comprise any suitable hardware and/or software configured to perform the functionality described above. The computing components 300 may be implemented using shared hardware or separate hardware. In certain embodiments, computing components 300 may be distributed in a cloud network environment.

In certain embodiments, the components comprise one or more interface(s) 302, processing circuitry 304, and/or memory(ies) 306. In general, processing circuitry 304 controls the operation and administration of a structure by processing information received from memory 306 and/or interface 302. Memory 306 stores, either permanently or temporarily, data or other information processed by processing circuitry 304 or received from interface 302. Interface 302 receives input, sends output, processes the input and/or output and/or performs other suitable operations. An interface 302 may comprise hardware and/or software.

Examples of interfaces 302 include user interfaces, network interfaces, and internal interfaces. Examples of user interfaces include one or more graphical user interfaces (GUIs), buttons, microphones, speakers, cameras, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 304 to exchange information with or through a network. Internal interfaces receive and transmit information among internal components of a structure.

Processing circuitry 304 communicatively couples to interface(s) 302 and memory 306, and includes any hardware and/or software that operates to control and process information. Processing circuitry 304 may include a programmable logic device, a microcontroller, a microprocessor, any suitable processing device, or any suitable combination of the preceding. Processing circuitry 304 may execute logic stored in memory 306. The logic is configured to perform functionality described herein. In certain embodiments, the logic is configured to perform the method described with respect to FIG. 2.

Memory 306 includes any one or a combination of volatile or non-volatile local or remote devices suitable for storing information. For example, memory comprises any suitable non-transitory computer readable medium, such as Read Only Memory ("ROM"), Random Access Memory ("RAM"), magnetic storage devices, optical storage devices, or any other suitable information storage device or a combination of these devices. Memory 306 may be local/integrated with the hardware used by processing circuitry 304 and/or remote/external to the hardware used by processing circuitry 304.

Embodiments of the present disclosure provide technological solutions to technological problems. For example, in certain embodiments, a computer determines how to route a data processing transaction based on machine learning. The machine learning may allow for more efficient routing of data processing transactions. Routing data processing transactions more efficiently may facilitate faster processing of the data processing transaction. Routing data processing transactions more efficiently may facilitate efficient use of computing resources, such as network resources, processing resources, or memory resources. As an example, by routing a data processing transaction more efficiently, certain embodiments may allow for reducing messaging involved in performing the data processing transaction, which may allow for reducing the computing resources required to perform the data processing transaction.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A routing system, the routing system comprising:
   a memory operable to store historical data associated with a plurality of previous data processing transactions; and
   a processor operably coupled to a network interface and the memory, and configured to:
   obtain the historical data associated with the plurality of previous data processing transactions transacted using a first routing between a first computing system and a second computing system, wherein:
   the first computing system is configured to transmit one or more requests to perform one or more data processing transactions to the second computing system; and
   the second computing system is configured to receive the one or more requests and perform the one or more data processing transactions;
   execute a machine learning algorithm to:
   determine one or more entities associated with each previous data processing transaction of the plurality of previous data processing transactions;
   assign each of the plurality of previous data processing transactions to a respective class based at least in part upon at least one associated entity;
   determine, based on the one or more entities and a plurality of class assignments, a plurality of recurring data processing transactions within the plurality of previous data processing transactions comprising a first entity and a first class, the plurality of recurring data processing transactions being transactions performed by the second computing system that were transacted using the first routing; and in response to determining the plurality of recurring data processing transactions, generate a second routing between the first computing system and the second computing system configured to route one or more upcoming data processing transactions comprising the first entity and the first class, the second routing being different from the first routing;

determine an upcoming data processing transaction comprising the first entity and the first class; and use the second routing to transact the upcoming data processing transaction.

2. The routing system of claim 1, wherein the processor is further configured to:

send the second computing system an instruction to cancel a configuration that automates using the first routing to transact the upcoming data processing transaction.

3. The routing system of claim 1, wherein the processor is further configured to:

receive data associated with the upcoming data processing transaction from a user;

detect an error in the data associated with the upcoming data processing transaction, the error detected based on comparing the data associated with the upcoming data processing transaction to the pattern; and use the pattern to correct the data associated with the upcoming data processing transaction.

4. The routing system of claim 1, wherein:

the first routing includes a third computing system that facilitates transacting the data processing transaction between the first computing system and the second computing system; and the second routing does not include the third computing system.

5. The routing system of claim 4, wherein the second routing uses a machine-to-machine communication channel between the first computing system and the second computing system.

6. The routing system of claim 1, wherein to determine the pattern, the processor is further configured to:

process the historical data to yield normalized data;

use the normalized data to assign the plurality of previous data processing transactions to one or more classes;

determine, based on the one or more classes, a subset of the plurality of previous data processing transactions, the subset comprising recurring data processing transactions; and determine the pattern based on the recurring data processing transactions.

7. The routing system of claim 1, wherein, prior to transacting the upcoming data processing transaction, the processor is further configured to:

send a recommendation to a user on behalf of whom the upcoming data processing transaction is to be transacted, the recommendation recommending to use the second routing to transact the upcoming data processing transaction; and receive a response from the user, wherein the response accepts the recommendation.

8. A method, the method comprising:

obtaining historical data associated with a plurality of previous data processing transactions, the plurality of previous data processing transactions transacted using a first routing between a first computing system and a second computing system, wherein:

the first computing system is configured to transmit one or more requests to perform one or more data processing transactions to the second computing system; and the second computing system is configured to receive the one or more requests and perform the one or more data processing transactions;

executing a machine learning algorithm to:

determining one or more entities associated with each previous data processing transaction of the plurality of previous data processing transactions;

assigning each of the plurality of previous data processing transactions to a respective class based at least in part upon at least one associated entity;

determining, based on the one or more entities and a plurality of class assignments, a plurality of recurring data processing transactions within the plurality of previous data processing transactions comprising a first entity and a first class, the plurality of recurring data processing transactions being transactions performed by the second computing system that were transacted using the first routing; and in response to determining the plurality of recurring data processing transactions, generating a second routing between the first computing system and the second computing system configured to route one or more upcoming data processing transactions comprising the first entity and the first class, the second routing being different from the first routing;

determining an upcoming data processing transaction comprising the first entity and the first class; and using the second routing to transact the upcoming data processing transaction.

9. The method of claim 8, further comprising:

sending the second computing system an instruction to cancel a configuration that automates using the first routing to transact the upcoming data processing transaction.

10. The method of claim 8, further comprising:

receiving data associated with the upcoming data processing transaction from a user;

detecting an error in the data associated with the upcoming data processing transaction, the error detected based on comparing the data associated with the upcoming data processing transaction to the pattern; and using the pattern to correct the data associated with the upcoming data processing transaction.

11. The method of claim 8, wherein:

the first routing includes a third computing system that facilitates transacting the data processing transaction between the first computing system and the second computing system; and the second routing does not include the third computing system.

12. The method of claim 11, wherein the second routing uses a machine-to-machine communication channel between the first computing system and the second computing system.

13. The method of claim 8, wherein determining the pattern comprises:

processing the historical data to yield normalized data;
using the normalized data to assign the plurality of previous data processing transactions to one or more classes;
determining, based on the one or more classes, a subset of the plurality of previous data processing transactions, the subset comprising recurring data processing transactions; and
determining the pattern based on the recurring data processing transactions.

14. The method of claim 8, wherein, prior to transacting the upcoming data processing transaction, the method further comprises:
sending a recommendation to a user on behalf of whom the upcoming data processing transaction is to be transacted, the recommendation recommending to use the second routing to transact the upcoming data processing transaction; and
receiving a response from the user, wherein the response accepts the recommendation.

15. A non-transitory computer-readable medium storing instructions that when executed by a processor cause the processor to:
obtain historical data associated with a plurality of previous data processing transactions, the plurality of previous data processing transactions transacted using a first routing between a first computing system and a second computing system, wherein:
the first computing system is configured to transmit one or more requests to perform one or more data processing transactions to the second computing system; and
the second computing system is configured to receive the one or more requests and perform the one or more data processing transactions;
execute a machine learning algorithm to:
determine one or more entities associated with each previous data processing transaction of the plurality of previous data processing transactions;
assign each of the plurality of previous data processing transactions to a respective class based at least in part upon at least one associated entity;
determine, based on the one or more entities and a plurality of class assignments, a plurality of recurring data processing transactions within the plurality of previous data processing transactions comprising a first entity and a first class, the plurality of recurring data processing transactions being transactions performed by the second computing system that were transacted using the first routing; and
in response to determining the plurality of recurring data processing transactions, generate a second routing between the first computing system and the second computing system configured to route one or more upcoming data processing transactions comprising the first entity and the first class, the second routing being different from the first routing;
determine an upcoming data processing transaction comprising the first entity and the first class; and
use the second routing to transact the upcoming data processing transaction.

16. The non-transitory computer-readable medium of claim 15, wherein, when executed by the processor, the instructions further cause the processor to:
send the second computing system an instruction to cancel a configuration that automates using the first routing to transact the upcoming data processing transaction.

17. The non-transitory computer-readable medium of claim 15, wherein, when executed by the processor, the instructions further cause the processor to:
receive data associated with the upcoming data processing transaction from a user;
detect an error in the data associated with the upcoming data processing transaction, the error detected based on comparing the data associated with the upcoming data processing transaction to the pattern; and
use the pattern to correct the data associated with the upcoming data processing transaction.

18. The non-transitory computer-readable medium of claim 15, wherein:
the first routing includes a third computing system that facilitates transacting the data processing transaction between the first computing system and the second computing system; and
the second routing does not include the third computing system.

19. The non-transitory computer-readable medium of claim 18, wherein the second routing uses a machine-to-machine communication channel between the first computing system and the second computing system.

20. The non-transitory computer-readable medium of claim 15, wherein, when executed by the processor, the instructions further cause the processor to:
in conjunction with determining the pattern:
process the historical data to yield normalized data;
use the normalized data to assign the plurality of previous data processing transactions to one or more classes;
determine, based on the one or more classes, a subset of the plurality of previous data processing transactions, the subset comprising recurring data processing transactions; and
determine the pattern based on the recurring data processing transactions.

* * * * *